United States Patent [19]
Beffa et al.

[11] 3,978,037
[45] Aug. 31, 1976

[54] AZO, AZO METHINE 1:2 CHROMIUM COMPLEX DYES

[75] Inventors: Fabio Beffa, Riehen; Alfred Fasciati, Bottmingen, both of Switzerland

[73] Assignee: Ciba-Geigy Corporation, Ardsley, N.Y.

[22] Filed: Dec. 4, 1974

[21] Appl. No.: 529,670

[30] Foreign Application Priority Data
Dec. 7, 1973  Switzerland.................... 17196/73

[52] U.S. Cl. .......................... 260/151; 260/146 R; 260/147; 260/148; 260/149; 260/150; 260/156; 260/159; 260/193; 260/196; 260/197; 260/198; 260/199; 260/200; 260/206; 260/310 A; 260/518 R; 260/566 R; 260/575; 260/578

[51] Int. Cl.² .................. C09B 45/16; C09B 45/26; C09B 55/00; D06P 3/24

[58] Field of Search ............ 260/145 A, 145 B, 150, 260/151

[56] References Cited
UNITED STATES PATENTS

| | | | |
|---|---|---|---|
| 2,711,404 | 6/1955 | Schetty | 260/145 |
| 2,814,614 | 11/1957 | Zickendraht | 260/145 |
| 2,855,393 | 10/1958 | Schetty et al. | 260/145 |
| 2,985,646 | 5/1961 | Schetty et al. | 260/145 |
| 3,189,594 | 6/1965 | Neier | 260/145 |
| 3,391,132 | 7/1968 | Beffa et al. | 260/145 |

FOREIGN PATENTS OR APPLICATIONS

| | | | |
|---|---|---|---|
| 511,437 | 3/1955 | Canada | 260/151 |
| 558,620 | 6/1958 | Canada | 260/151 |
| 1,351,192 | 12/1963 | France | 260/151 |
| 924,452 | 4/1963 | United Kingdom | 260/145 |
| 1,197,265 | 7/1970 | United Kingdom | 260/147 |

*Primary Examiner*—Floyd D. Higel
*Assistant Examiner*—John J. Doll
*Attorney, Agent, or Firm*—Joseph G. Kolodny; Edward McC. Roberts; Prabodh I. Almaula

[57] ABSTRACT

1:2 Chromium complex dyes of the formula

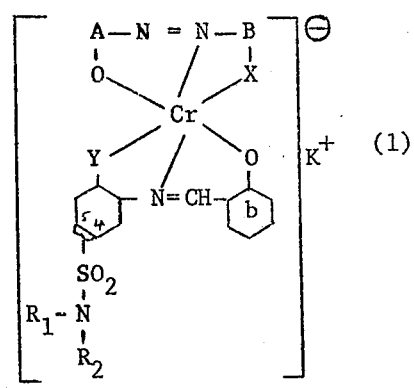

wherein A represents the radical of a diazo component, B represents the radical of a coupling component, —X— is —O—, —NH—, $$-\underset{|}{N}-\text{alkyl}, -\underset{|}{N}-\text{aralkyl or } -\underset{|}{N}-\text{aryl},$$

—Y— is —O— or —COO—, $R_1$ is hydrogen or alkyl and $R_2$ is a radical of the benzene or naphthalene class which is substituted by a carboxy or a sulpho group, $K^+$ represents a cation, and wherein the benzene ring $b$ can carry a further fused benzene ring or can be substituted by halogen, nitro, low molecular alkyl or alkoxy as well as arylazo groups, and the radicals A and B are devoid of —$SO_3H$ and —COOH groups. These dyes are useful for dyeing and printing natural and synthetic polyamides to produce level dyeings of good fastness, especially fastness to pulling, water and perspiration.

4 Claims, No Drawings

AZO, AZO METHINE 1:2 CHROMIUM COMPLEX DYES

The present invention provides 1:2 chromium complex dyes of the formula

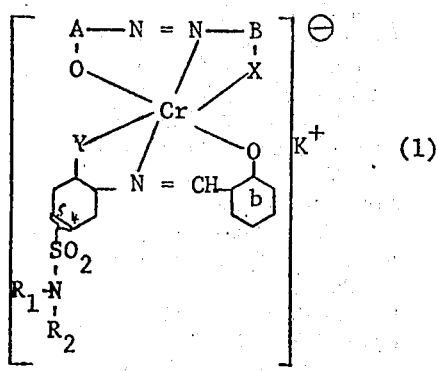

(1)

wherein A represents the radical of a diazo component which carries the complex forming oxygen atom in ortho-position to the azo group, B represents the radical of a coupling component which carries the complex forming group —X— in ortho-position to the azo group, X represents an oxygen atom, a —NH— group or a low molecular —N—alkyl, —N—aralkyl or N-aryl group, Y represents an oxygen atom or the —COO group, $R_1$ represents hydrogen or a low molecular alkyl group and $R_2$ represents a radical of the benzene or naphthalene class which is substituted by a carboxy or a sulpho group, $K^+$ represents a cation, and wherein the benzene ring b can carry a further fused benzene ring or can be substituted by halogen, nitro, low molecular alkyl or alkoxy as well as arylazo groups, and the radicals A and B are devoid of —$SO_3H$ and —COOH groups.

The term "low molecular" denotes herein groups with 1 to 4 carbon atoms. The term "aryl" denotes above all the phenyl group and the phenyl group which is substituted by halogen, nitro, low molecular alkyl or alkoxy, and "aralkyl" denotes above all the benzyl group.

The dyes of the formula (1) are obtained by converting a dye of the formula

A—N=N—B
|     |
OH   XH (2)

or

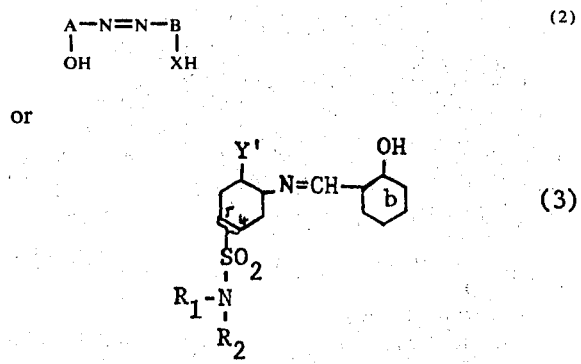

(3)

wherein A, B, X, $R_1$, $R_2$ and b have the meanings assigned to them in respect of the formula (1) and Y' represents the —OH or —COOH group, with a chromium donor into the 1:1 chromium complex and subsequently reacting this latter with the non-metallised dye of the formula (3) or (2) to give the 1:2 chromium complex. Preferably, the 1:1 complex of the azo dye of the formula (2) is formed first and the azomethine dye is added thereto. Instead of the dye of the formula (3), it is also possible to use the corresponding educts, i.e. amines of the formula

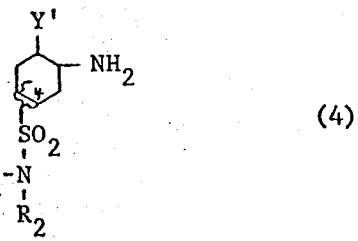

(4)

and aldehydes of the formula

(5)

since azomethine dyes are readily formed.

Instead of the hydroxy groups which are capable of complex formation, the dyes of the formula (2) or (3) can carry substituents which can be converted into metallisable groups, e.g., low molecular alkoxy groups, in particular methoxy groups, provided these are split during the chroming to form a hydroxy group.

The dyes of the formula (2) can be manufactured in known manner by coupling. The radical A can be a radical of the benzene or naphthalene class and, in addition to the complex forming group, can carry the customary non-ionogenic substituents, e.g. chlorine, bromine, cyano, nitro, low molecular alkyl, low molecular alkoxy, aryloxy, above all phenoxy, sulphonamido and N-monosubstituted or N,N-disubstituted sulphonamido groups, sulphone groups and acylamino groups.

The term "acylamino" denotes herein amino groups which are substituted by acyl radicals of aliphatic or aromatic sulphonic and, in particular, carboxylic acids or of carbonic acid monoalkyl or monoaryl esters. Ther term "acyl" thus comprises low molecular alkanoyl, alkoxycarbonyl and alkylsulphonyl groups, such as the acetyl, chloroacetyl, propionyl, butyryl, methoxycarbonyl, ethoxycarbonyl, methylsulphonyl or ethylsulphonyl groups, as well as aroyl, aryloxycarbonyl and arylsulphonyl groups, e.g. the benzoyl, chlorobenzoyl, methylbenzoyl, nitrobenzoyl, phenoxycarbonyl, phenylsulphonyl or p-methylphenylsulphonyl group. Preferred acylamino groups are low molecular alkanoylamino, alkoxycarbonylamino or optionally substituted benzoylamino groups.

As monosubstituted or disubstituted sulphonamido groups mention may be made principally of the sulphonamido groups which are substituted by low molecular alkyl, hydroxyalkyl, alkoxyalkyl, cyanoalkyl, aralkyl, cycloalkyl, in particular cyclohexyl, aralkyl, in particular benzyl, or by aryl radicals. Suitable sulphone groups are primarily low molecular alkylsulphonyl groups, low molecular alkylsulphonyl groups which are substituted by hydroxy, chlorine or low molecular alkoxy, chlorophenylsulphonyl, methylphenylsulphonyl, nitrophenylsulphonyl, methoxyphenylsulphonyl or benzylsulphonyl groups.

Suitable diazo components of dyes of the formula (2) are:
2-amino-1-hydroxybenzene, 2-amino-1-methoxybenzene, 4-chloro- and 4,6-dichloro-2-amino-1-hydroxybenzene, 4- or 5- or 6-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxybenzene-5-methylsulphone and -5-benzylsulphone, 2-amino-1-hydroxybenzene-4-methylsulphone, -4-ethylsulphone, -4-chloromethylsulphone and -4-butylsulphone, 6-chloro-, 5-nitro- and 6-nitro-2-amino-1-hydroxybenzene-4-methylsulphone, 2-amino-1-hydroxybenzene-4- or -5-sulphamide, 2-amino-1-hydroxybenzene-4- or -5-sulph-N-methylamide and -sulph-N-β-hydroxyethylamide, 2-amino-1-methoxybenzene-4-sulphanilide, 4-methoxy-5-chloro-2-amino-1-hydroxybenzene, 4-methyl-2-amino-1-hydroxybenzene, 4-chloro-5-nitro-2-amino-1-hydroxybenzene, 4,5-dichloro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-5-or -6-sulphonic acid amide, 4- or 5-chloroanisidine, 4-nitroanisidine or 5-nitroanisidine, 2-methoxy-5-methylaniline, 2,5-dimethoxyaniline, 2-anisidine-4- or -5-β-hydroxyethylsulphone.

The radical B can be derived in particular from the following groups of coupling components:
naphthols which are optionally substituted by chlorine, acylamino, amino, sulphonamido, N-monosubstituted or N-N-disubstituted sulphonamido groups and sulphone groups, these groups having the same meanings as previously assigned to them;
naphthylamines which are substituted by halogen, in particular bromine, methyl, methoxy, sulphonamido, monosubstituted or disubstituted sulphonamido or sulphone groups; 5-pyrazolones which have in 1-position a phenyl or naphthyl radical which is optionally substituted by chlorine, nitro, low molecular alkyl and alkoxy groups, sulphonamido, N-alkylated sulphonamido groups or sulphone groups; acetoacetic acid anilides and benzoylacetic acid anilides which can be optionally substituted in the anilide nucleus by low molecular alkyl, alkoxy, alkylsulphonyl groups, low molecular hydroxy, alkoxy or cyanoalkylsulphonyl groups, sulphonamido and N-alkylated sulphonamido groups, and by halogen;
phenols which are substituted by low molecular acylamino groups and/or by alkyl groups containing 1 to 5 carbon atoms and which couple in the orthoposition.

Examples of such coupling components are:
2-naphthol,
1,3- or 1,5-dihydroxynaphthalene,
2-naphthol-6-sulphonamide,
2-naphthol-6-β-hydroxyethylsulphone,
1-amino-7-naphthol,
1-acetylamino-7-naphthol,
1-propionylamino-7-naphthol,
1-carbomethoxyamino-7-naphthol,
1-carboethoxyamino-7-naphthol,
1-carbopropoxy-amino-7-naphthol,
1-dimethylaminosulphonyl-amino-7-naphthol,
6-acetyl-2-naphthol,
4-acetyl-2-naphthol,
4-methoxy-1-naphthol,
4-acetyl-1-naphthol,
1-naphthol-3-, -4- or -5-sulphonamide,
2-naphthol-3-, -4-, -5-, -6-, -7- or -8-sulphonamide,
5,8-dichloro-1-naphthol,
5-chloro-1-naphthol,
2-naphthylamine,
1-naphthylamine-4-sulphonamide,
2-methylaminonaphthalene,
2-aminonaphthalene-6-sulphonamide,
6-methyl-2-aminonaphthalene,
6-bromo-2-aminonaphthalene,
6-methoxy-2-aminonaphthalene,
2-phenylaminonaphthalene,
2-(3'-chlorophenyl)-aminonaphthalene,
2-aminonaphthalene-6-sulphonic acid-N-methylamide,
1,3-dimethylpyrazolone,
1-phenyl-3-methyl-5-pyrazolone,
1-(2'-, 3'- or 4'-methylphenyl)-3-methyl-5-pyrazolone,
1-[3'- or 4'-(β-hydroxyethylsulphonyl)-phenyl]-3-methyl-5-pyrazolone,
1-(3'- or 4'-aminophenyl)-3-methyl-5-pyrazolone,
1-(2'-methoxyphenyl)-3-methyl-5-pyrazolone,
1-(2'-, 3'- or 4'-chlorophenyl)-3-methyl-5-pyrazolone,
1-(2'-, 3'- or 4'-nitrophenyl)-3-methyl-5-pyrazolone,
1-(2'-, 5'- or 3'-, 4'-dichlorophenyl)-3-methyl-5-pyrazolone,
1-(2'-, 3'- or 4'-sulphamoylphenyl)-3-methyl-5-pyrazolone,
1-(2'-, 3'- or 4'-methylsulphonylphenyl)-3-methyl-5-pyrazolone,
acetoacetic anilide,
acetoacetic-4-(β-hydroxyethylsulphonyl)-anilide,
acetoacetic-o-anisidide,
acetoacetic-o-toluidide,
acetoacetic-o-chloroanilide,
acetoacetic anilide-3- or -4-sulphonamide,
acetoacetic-3- or -4-aminoanilide,
acetoacetic-m-xylidide,
4-methylphenol,
3-dialkylaminophenol, especially 3-dimethylamino- and
3-diethylaminophenol,
4-butylphenol,
4-amylphenol,
2- or 3-acetylamino-4-methylphenol,
2-methoxycarbonylamino-4-methylphenol,
2-ethoxycarbonylamino-4-methylphenol,
3,4-dimethylphenol and 2,4-dimethylphenol, The following amines, for example, are suitable for the manufacture of the azomethine dye of the formula (3), which is obtained in known manner by condensation of an amine of the formula (4) with an aldehyde of the formula (5):
2-amino-1-hydroxybenzene-4- and -5-sulphanilide-2'- or
-4-'-carboxylic acid,
-2-amino-1-hydroxybenzene-4- and -5-sulphanilide-2'-, -3'- or -4'-sulphonic acid,
2-amino-4-N-(6'-sulphonaphthyl-2')-sulphonamido-1-hydroxybenzene,
2-amino-1-hydroxybenzene-4-sulph-(N-methyl- or N-ethyl-N-carboxyphenylamide), 2-amino-1-hydroxy-5-sulph-(N-methyl or N-ethyl-N-carboxyphenylamide).

Examples of suitable aldehydes of the formula (5) are:

2-hydroxybenzaldehyde,
3- and 5-methyl-2-hydroxybenzaldehyde,
3,5- and 3,6-dimethyl-2-hydroxybenzaldehyde,
5-butyl-2-hydroxybenzaldehyde,
5-chloro- or -bromo-2-hydroxybenzaldehyde,
3- and 4-chloro-2-hydroxybenzaldehyde,
3,5-dichlor-2-hydroxybenzaldehyde,
3-chloro-5-methyl-2-hydroxybenzaldehyde,
3-methyl-5-chloro-2-hydroxybenzaldehyde,
3- and 4- and 5-nitro-2-hydroxybenzaldehyde,
3,5-dinitro- and 4-chloro-5-nitro-2-hydroxybenzaldehyde,
4-methoxy-2-hydroxybenzaldehyde,
1-hydroxy-2-naphthaldehyde and its derivative which is chlorinated in 4-potition, and 2-hydroxy-1-naphthaldehyde.

Azomethine dyes of the formula (3), which are substituted in the aldehyde component by an arylazo group, are obtained by coupling in known manner an aromatic diazonium compound with an o-hydroxyaldehyde and condensing the resultant arylazo-hydroxyaldehyde with amines of the formula (4).

Preferably, those azo dyes of the formula (2) are chosen wherein A represents a radical of the benzene or naphthalene class and B represents the radical of a naphthol which couples in the ortho-position to the hydroxy group.

A preferred group of such azo dyes has the formula

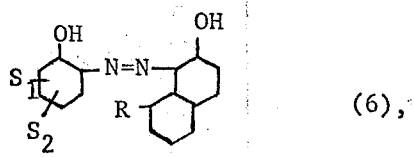

wherein $S_1$ represents a hydrogen atom or has the same meaning as $S_2$, $S_2$ represents chlorine, bromine, a nitro, cyano, low molecular alkyl, alkoxy, alkanoylamino or alkoxycarbonylamino group, a low molecular alkylsulphonyl group, a phenylsulphonyl group, the $-SO_2NH_2$ group or a low molecular N-monoalkylsulphonamido or N,N-dialkylsulphonamido group, and R represents a hydrogen atom, a low molecular alkanoylamino or alkoxycarbonylamino group or a benzoylamino group.

Amines chosen as components for the azomethine dyes of the formula (3) are preferably 2-amino-4-N-(sulphophenyl or carboxyphenyl)-sulphonamido-1-hydroxybenzenes or 2-amino-4-N-(sulphonaphthyl or carboxynaphthyl)-sulphonamido-1-hydroxybenzenes, and salicylaldehyde or derivatives thereof are chosen as aldehyde components.

A preferred group of azomethine dyes comprises those of the formula

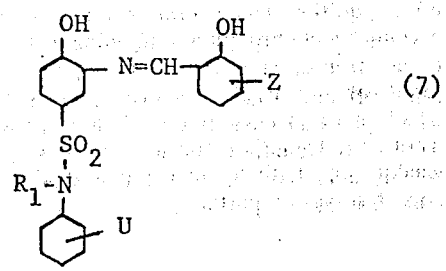

wherein U represents a -COOH or $-SO_3H$ group which is desirably in ortho-position, Z represents a hydrogen atom or an arylazo group which is preferably in para-position to the -OH group, and $R_1$ represents a low molecular alkyl group or preferably a hydrogen atom. Z in the significance of an arylazo group preferably has the formula

wherein D represents a phenyl radical which is optionally substituted by halogen, lower alkyl or alkoxy or nitro, or represents a naphthyl radical.

The conversion of the monoazo dye of the formula (2) or of the azomethine dye of the formula (3) into the 1:1 chromium complex is accomplished by conventional methods which are known per se, e.g. by reacting it in an acid medium with a salt of trivalent chromium, e.g. chromium formate, chromium sulphate, chromium chloride hexahydrate or chromium fluoride, at boiling temperature or optionally at temperatures exceeding 100°C. Trivalent chromium can also be obtained in known manner from chromium-(VI) compounds, e.g. chromate, by adding a reducing agent, e.g. butanol, to reaction mixture. In general, it is advisable to carry out the metallising for example in the presence of organic solvents, such as alcohols or ketones.

It is normally advantageous not to dry the starting dyes required in the present process after their manufacture and precipitation, but to process them further as a moist paste.

The reaction of the 1:1 chromium complex of the dye of the formula (2) or (3) with the metal-free dye of the formula (3) or (2), or the single step reaction between a 1:1 chromium complex of a dye of the formula (2), an amine of the formula (4) and an aldehyde of the formula (5), is desirably carried out in a neutral to weakly alkaline medium, in an open or a sealed vessel, and at normal or elevated temperature, e.g. at temperatures between 50° and 120°C. The process can be carried out in organic solvents, e.g. alcohols or ketones or in an aqueous solution, in which case the addition of solvents, e.g. alcohols, formamide etc., can promote the reaction if so desired. It is usually advisable to react as far as possible equivalent amounts of the chromium-containing 1:1 complex and the metal-free dye, the molecular ratio between metal-free dye and 1:1 complex being desirably at least 0–85:1 and at most 1:0.85. A surplus of metal-containing dye is usually less disadvantageous than one of metal-free dye. The closer this ratio is to 1:1 the more advantageous the result generally is.

The novel chromium-containing mixed complexes obtained by the above processes are isolated with advantage in the form of their salts, in particular alkali salts, above all sodium salts, or also ammonium salts or salts of organic amines with positively charged nitrogen atoms, and are suitable for dyeing and printing the most varied materials, but chiefly for dyeing materials made from natural polyamides, such as silk, wool, and leather, but mainly for dyeing and printing synthetic polyamide fibres, e.g. fibres made from polyamides or polyurethanes. They are readily soluble in water, above all in the form of their alkali salts, and are suitable for dyeing from a neutral or weakly acid bath, for example from an acetic acid bath.

The novel dyes have good affinity for both natural and synthetic polyamide and produce level dyeings of good fastness properties (fastness to light, washing, water, perspiration, fulling, decatising, carbonising, alkali, acid and rubbing). The good wet fastness properties are to be particularly highlighted, especially the fastness to fulling, water and perspiration.

The following Examples illustrate the invention, the parts and percentages being by weight unless otherwise stated.

EXAMPLE 1

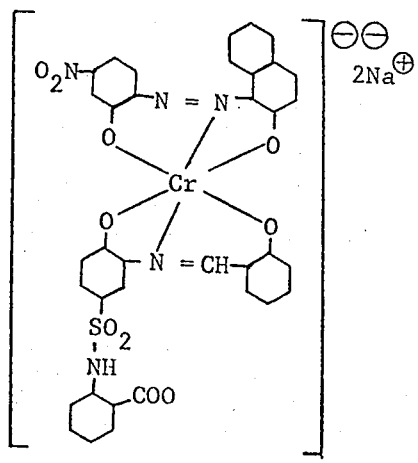

35.9 parts of the 1:1 complex chromium compound (which corresponds to 5.2 parts of chromium and 30.9 parts of the monoazo dye obtained from diazotised 5-nitro-2-amino-1-hydroxybenzene and 2-hydroxynaphthalene), 30.8 parts of 2-amino-1-hydroxybenzene-4-sulph-2′-carboxyanilide and 12.2 parts of salicylaldehyde as well as 18 parts of sodium carbonate in the form of a 20% aqueous solution are suspended in 500 parts of ethylene glycol. The mixture is heated to 80°–85°C and held thereat until the starting substances can no longer be detected. The novel chromium-containing dye is precipitated by addition of saturated sodium chloride solution, filtered off and dried. The product is a dark powder which dyes wool or polyamide material from a neutral to weakly acid bath in olive green shades of good fastness properties.

EXAMPLE 2

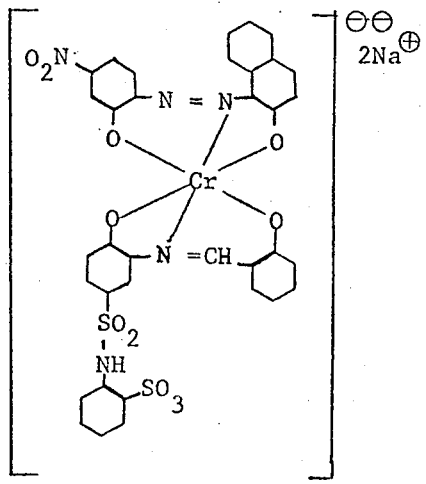

30.9 parts of the monoazo dye obtained from diazotised 5-nitro-2-amino-1-hydroxybenzene and 2-hydroxynaphthalene are dissolved in 500 parts of n-butanol. After addition of 26.65 parts of chromium chloride hexahydrate, the batch is stirred and the water which forms is removed as an azeotrope. The chroming is terminated after 1 to 2 hours. The dye solution is then treated with 34.4 parts of 2-amino-1-hydroxybenzene-4-sulph-(2′-sulphonic acid)-anilide, 12.2 parts of salicylaldehyde and 30 parts of calcined sodium carbonate and stirring is continued for a further 1 to 2 hours at 110°–117°C. Upon completion of the reaction, the reaction mixture is filtered clear and the dye solution is evaporated to dryness. A dark powder is obtained which dissolves extraordinarily well in water to give an olive green solution and dyes wool or polyamide material from a neutral to weakly acid bath in olive green shades of generally good wet fastness properties and very good light fastness.

EXAMPLE 3

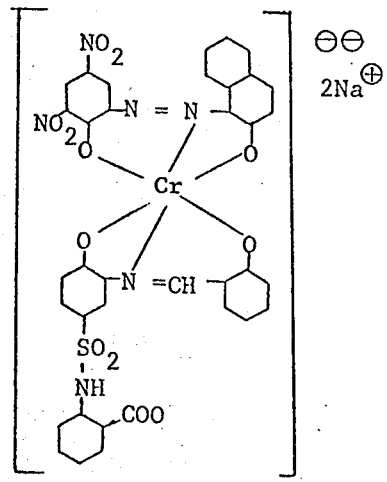

35.4 parts of the monoazo dye obtained from diazotised 4,6-dinitro-2-amino-1-hydroxybenzene and 2-hydroxynaphthalene are stirred with 26.65 parts of chromium chloride hexahydrate in 500 parts by volume of ethylene glycol at 120°–125°C until the starting compound can no longer be detected. The solution of the 1:1 chromium complex dye is then treated with 30.8 parts of 2-amino-1-hydroxybenzene-4-sulphanthranilide, 12.2 parts of salicylaldehyde and 80 parts by volume of sodium carbonate solution (20%) and stirring is continued for a further 1 to 2 hours at 80°–85°C to effect addition. Upon termination of the reaction, the asymmetrical chromium-containing dye is precipitated by addition of saturated sodium chloride solution, filtered off and dried. The product is a black powder which gives an olive green solution in water and dyes wool or polyamide material as well as leather from a weakly acid bath in olive green shades of generally good fastness properties.

EXAMPLE 4

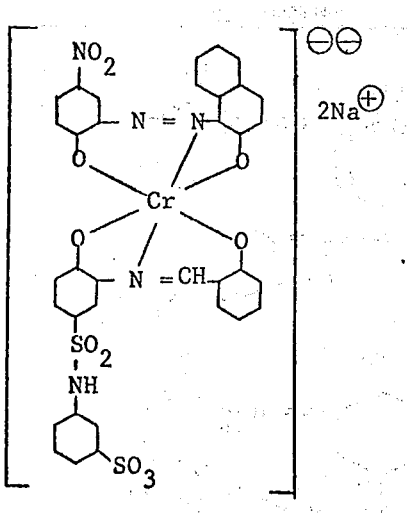

30.9 parts of the monoazo dye obtained from diazotised 4-nitro-2-amino-1-hydroxybenzene and 2-hydroxynaphthalene are dissolved in 400 parts by volume of methyl isobutyl ketone. Upon addition of 26.65 parts of chromium chloride hexahydrate, the solution is stirred for 1 to 2 hours at 105°–117°C and the water which forms is removed as an azeotrope. The dye solution is then treated with 34.4 parts of 2-amino-1-hydroxybenzene-4-sulph(3'-sulphonic acid) anilide and 12.2 parts of salicylaldehyde and stirring is continued for a further 1 to 2 hours at 110°–117°C. Upon termination of the reaction, the reaction mixture is filtered clear and the dye solution is evaporated to dryness. The product is a dark powder which dissolves readily in water and dyes wool and polyamide material in brown shades of very good fastness properties. By carrying out the procedure as described in Examples 1 to 4, but using equivalent amounts of the 1:1 chromium complexes and azomethine dyes listed in the Table, 1:2 chromium complex dyes are obtained which dye wool and polyamide in the shades indicated in the last column of the Table with similarly good fastness properties.

| No. | (1:) chromium complex from | azomethine dye | shade |
|---|---|---|---|
| 1. | | | olive green |
| 2. | | | " |
| 3. | | | " |
| 4. | | | " |

-continued

| No. | (1:) chromium complex from | azomethine dye | shade |
|---|---|---|---|
| 5. | | | " |
| 6. | | | " |
| 7. | | | olive green |
| 8. | | | brown |
| 9. | | | orange |
| 10. | | | " |

-continued

| No. | (1:) chromium complex from | azomethine dye | shade |
|---|---|---|---|
| 11. | | | yellow |
| 12. | | | olive |
| 13. | | | brown |
| 14. | | | " |
| 15. | | | " |
| 16. | | | green |

-continued
| No. | (1:) chromium complex from | azomethine dye | shade |
|---|---|---|---|
| 17. | 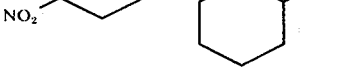 | 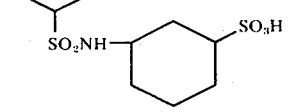 | green |
| 18. |  | 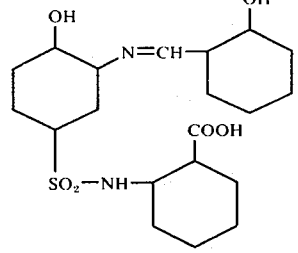 | '' |
| 19. | 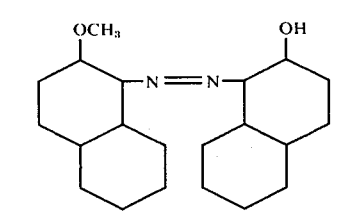 | 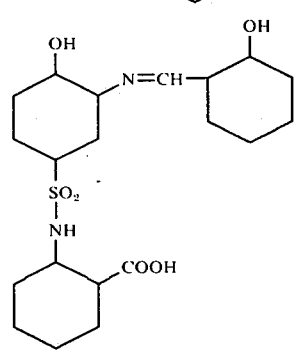 | olive green |
| 20. | 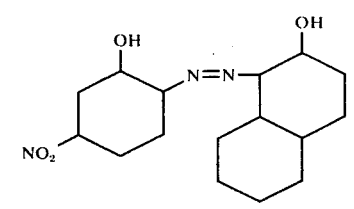 | 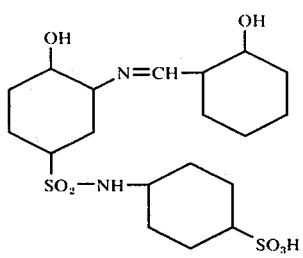 | '' |
| 21. | 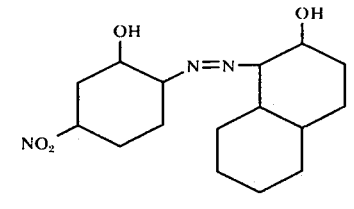 | 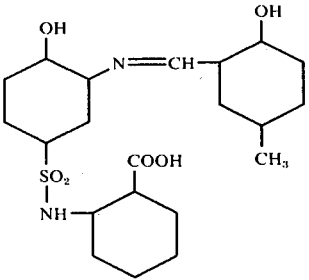 | '' |
| 22. | 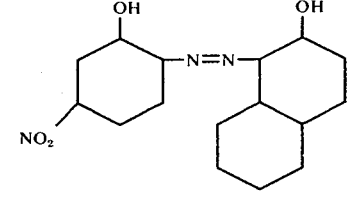 | 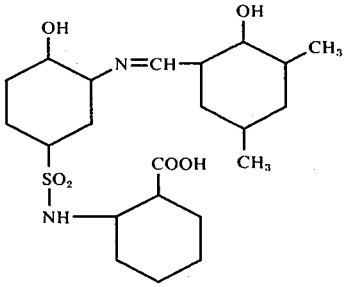 | olive green |

| No. | (1:) chromium complex from | azomethine dye | shade |
|---|---|---|---|
| 23. | | | " |
| 24. | | | " |
| 25. | | | " |
| 26. | | | brown |
| 27. | | | brown |
| 28. | | | olive |

-continued

| No. | (1:) chromium complex from | azomethine dye | shade |
|---|---|---|---|
| 29. | | | greyish blue |
| 30. | | | " |
| 31. | | | " |
| 32. | | | olive |
| 33. | | | olive green |
| 34. | " | | olive green |

PROCEDURE FOR DYEING WOOL 4 parts of the chromium-containing dye according to Example 3 are dissolved in 4000 parts of water and 100 parts of thoroughly moistened wool are put into this dyebath at 40°–50°C. Then 2 parts of 40% acetic acid are added and the bath is heated to the boil over the course of ½ hour and kept for ¾ hour at boiling temperature. The wool is then rinsed with cold water and dried. The olive green dyeing is characterised by good wet fastness properties and by excellent light fastness. fastness.

PROCEDURE FOR DYEING POLYAMIDE 100 parts of nylon 66 fabric are put at 50°–60°C into a dyebath consisting of 3000 parts of water, 5 parts of 40% acetic acid, 10 parts of sodium sulphate and 2 parts of the chromium complex of Example 1. After the bath has been heated to the boil over the course of ½ hour, dyeing is carried out for a further hour at boiling temperature. The material is rinsed and dried and a level, olive green dyeing is obtained.

We claim:
1. A 1:2 chromium complex dye of the formula

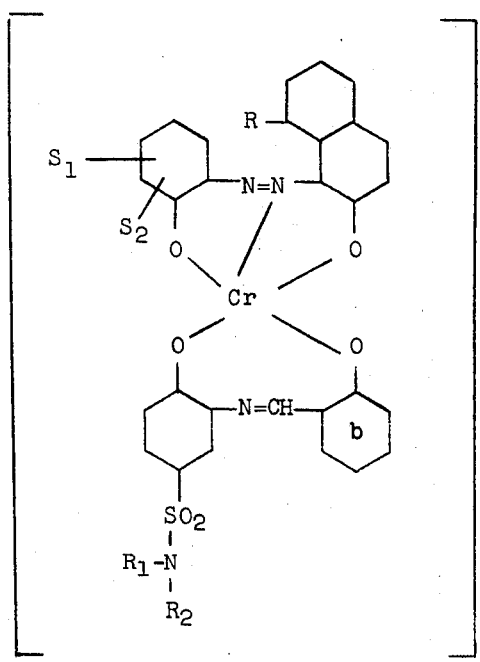

wherein $S_1$ is hydrogen or $S_2$;
  $S_2$ is chloro, bromo, nitro, cyano, lower alkyl, lower alkoxy, lower alkanoylamino, lower alkoxycarbonylamino, lower alkylsulfonyl, phenylsulfonyl, $-SO_2NH_2$, lower N-monoalkylsulfonamido, or lower N,N-dialkylsulfonamido;
  R is hydrogen, lower alkanoylamino, lower alkoxycarbonylamino or benzoylamino;
  $R_1$ is hydrogen or lower alkyl;
  $R_2$ is phenyl or napthyl, said phenyl or napthyl substituted by carboxy or sulpho;
  the benzene ring b is unsubstituted, or is substituted by fused phenyl; halo; nitro; lower alkyl; lower alkoxy; phenylazo which is unsubstituted or substituted by halo, lower alkyl, lower alkoxy, nitro; or napthylazo, and $K^+$ is a cation.

2. A 1:2 chromium complex according to claim 1, of the formula

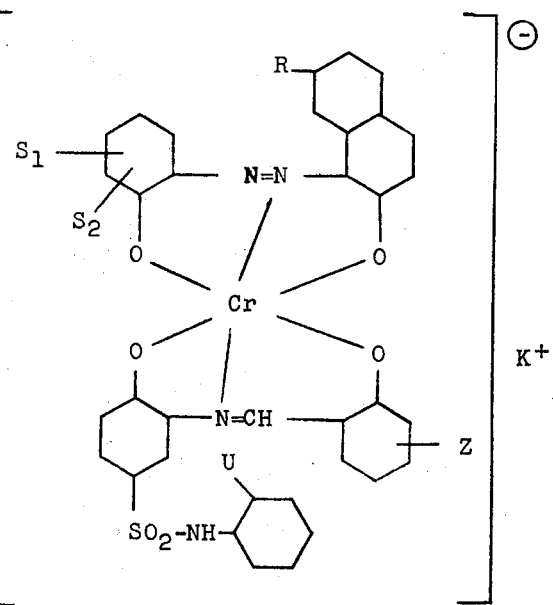

wherein U is carboxy or sulfo, and
  Z is hydrogen or -N=N-D where D is phenyl or phenyl substituted by halo, lower alkyl, lower alkoxy or nitro; or D is napthyl.

3. A 1:2 chromium complex dye according to claim 2, wherein $S_1$ is hydrogen, $S_2$ is nitro which is para to the azo group, R is hydrogen and Z is hydrogen.

4. The 1:2 Chromium complex dye according to claim 1 of the formula

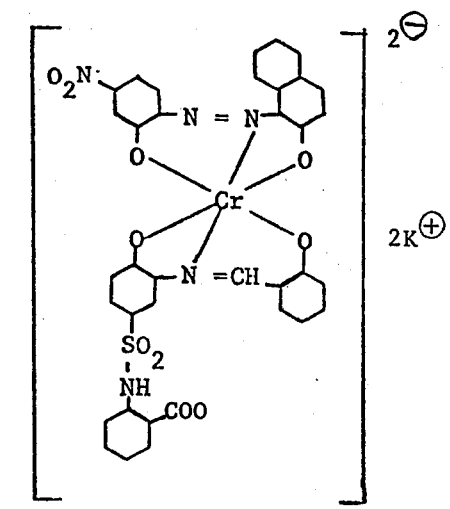

wherein $K^+$ represents a cation.

* * * * *